March 21, 1939.  R. C. JOHNSON  2,151,516
RADIATION HEATER
Filed Feb. 20, 1936
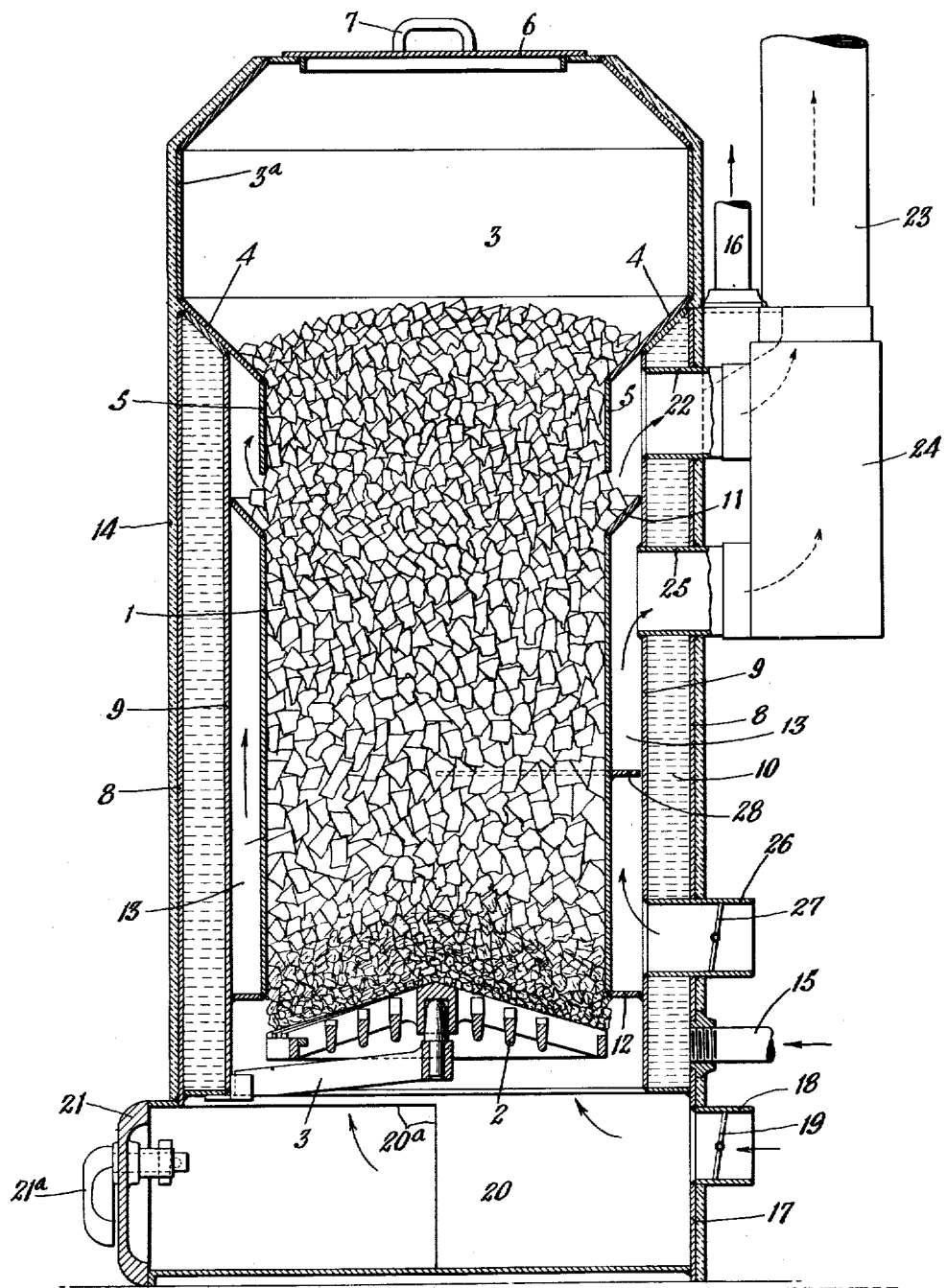
INVENTOR
RAYMOND C. JOHNSON
BY
E. C. Sanborn
ATTORNEY Patented Mar. 21, 1939

2,151,516

UNITED STATES PATENT OFFICE 2,151,516

RADIATION HEATER

Raymond C. Johnson, West Brunswick Township, Schuylkill County, Pa., assignor to The Philadelphia and Reading Coal and Iron Company, Philadelphia, Pa., a corporation of Pennsylvania Application February 20, 1936, Serial No. 64,835

11 Claims. (Cl. 122—30)

This invention relates to an apparatus for burning solid fuel in a fire pot and transferring the sensible heat from the fuel to the medium being heated, by radiation.

The invention is particularly advantageous in domestic heating installations and involves a principle which is in distinct contrast to the generally accepted modes of heating. In furnaces heretofore used, the transfer of heat from the fire pot to the heating medium whether it be water, air, steam, vapor, or other fluid, is accomplished mainly by convection and conduction.

My invention is based on the principle that the transfer of heat between two bodies by radiation varies as the difference between the fourth powers of the absolute temperatures of said bodies, whereas heat transferred by conduction and convection for all practical purposes may be considered as varying only as the difference between the first powers of the absolute temperatures. By my invention I propose to take advantage of this distinction to increase the flexibility of a solid-fuel-burning heater to supply heat only as required and to effect marked economies in fuel consumption.

It is an object of my invention to provide an apparatus for transferring heat from a solid-fuel-burning fire pot principally by direct radiation.

It is a further object of my invention to space a solid-fuel-burning fire pot from a jacket containing a fluid to be heated whereby the fire pot may be surrounded and the transfer of heat to the fluid will be effected principally by radiation.

A particular advantage of my invention resides in the practical elimination of overheating or overruns and the functioning of the apparatus as an automatic thermal valve without any moving parts.

Further objects and advantages of the invention will become apparent and the foregoing features will be more fully understood in connection with the description of one embodiment of the invention.

The figure of the drawing shows one application of the invention and illustrates a vertical cross section through a domestic water heater applying the principle of my invention.

It has been found by actual experiment that typical domestic hot water demands have been met for more than a week by such an apparatus without adding fuel, shaking the grates or any other attention whatsoever. In the drawing, numeral 1 indicates a shell which may be of a cylindrical or other shape and defines a fire pot of a solid-fuel-burning furnace. Solid fuel may be supported upon the grate 2, which may be of any suitable construction for allowing a combustion medium, such as air, to pass upwardly therethrough. This grate may be supported in any desirable manner as by an arm 3. Fuel is preferably fed to the fire pot, as defined by the grate 2 and the shell 1, through a magazine indicated generally at 3. This magazine may comprise a storage compartment 3a above the shell 1 and is preferably provided with inwardly sloping side walls 4 and vertical depending walls 5 for directing the fuel into the fire pot. The magazine is preferably tightly closed as by the lid 6, having a handle 7.

Spaced from the shell 1, and surrounding the same, is a jacket made up of an outer wall 8 and an inner wall 9 and designed to contain the fluid medium 10 to be heated which, in this embodiment, is water. An inverted frustoconical section 11 and an annular member 12 are positioned to cooperate with the shell 1 in defining a closed air space 13 between the shell 1 and the wall 9. The outer fluid-containing jacket and the magazine are preferably provided with a heat insulating layer 14 which may be of some relatively non-conducting material or provided with a reflective outer surface as is understood in the art. Water to be heated is supplied to the outer jacket by pipe 15 and the heated water is drawn off through the pipe 16. Air for combustion may be supplied to the ash pit 17 by means of the opening 18 and the supply thereof may be readily controlled by a suitable damper 19. An ash pit 20 is preferably provided with a section 20a of suitable shape to cooperate with a tightly fitting door 21 provided with a handle 21a. The top of the shell 1 is preferably spaced from the lower end of the depending walls 5 a sufficient distance to allow the products of combustion to pass out through the pipes 22 and 23 to a chimney or other flue. These pipes 22 and 23 are connected by a chamber 24 which also communicates with the air space 13 by way of pipe 25. Air may be supplied to this space 13 as desired by the opening 26 and may be suitably regulated by damper 27. Baffles, such as 28, may be employed in the air space 13 to good advantage for ensuring a complete circulation of air therethrough.

In the operation of this device, fuel is supplied to the grate 2 and ignited. The shell 1 and the magazine may be completely filled with coal or other solid fuel and the damper 19 is then adjusted to provide air for the amount of combustion desired. Under ordinary conditions when the fire is on draft, the damper 27 may remain closed. Practically all of the heat transferred to the water 10 will be radiated across the air space 13 from the walls of the shell 1, which may advantageously be formed of rough oxidized iron or steel. Heat will be radiated across this space 13 to the wall 9 at a rate proportional to the difference between the four powers of the absolute temperatures of the shell 1 and the wall 9. The distance between the two walls does not substantially affect the amount of heat transferred. Owing to this fourth power law of radiation, the amount of heat transferred varies enormously with changes in the temperature of the shell 1. Thus when the fire is on draft, the water 10 will be rapidly heated. As soon as the fire is banked however, or the draft reduced to the minimum, the temperature of the shell 1 will decrease and the amount of heat transferred to the water 10 will decrease in accordance with the principle above set forth. It will be seen, therefore, that the effect of this heater is in the nature of a valve which efficiently and automatically controls the flow of useful heat from the fire pot without any moving parts.

Two disadvantages of solid-fuel heaters previously used are thus overcome. In the first place the danger of overheating the water 10 after the fire is checked or what is known as "overrun" is practically eliminated. An example of this may be useful as an illustration. With the fire pot at 2000° F. having a total radiating surface of one square foot, the heat radiated per hour to a surface at 150° F. (at 100% efficiency) would be 62,798 B. t. u. If the temperature of the fire pot is then dropped to 1000° F. the rate of heat radiation under these conditions would amount to only 7578 B. t. u. per hour. Now assuming that the heat is to be transferred from the fire pot by conduction and/or convection in a case where the hypothetical fire pot temperature is 2000° F. and 62,798 B. t. u. are transferred per hour. If the fire pot temperature should drop to 1000° F., there would still be in the neighborhood of 28,500 B. t. u. transferred each hour.

Overheating as applied to domestic hot water supplies is dangerous in that persons may be scalded. There is also the danger of a tank exploding if safety valves do not function properly, as well as of corrosion of the tanks and pipes due to excessively hot water. As a practical matter with solid-fuel water heaters heretofore used, it has been essential to employ a bare or uninsulated hot water storage tank in order to dissipate excessive heat produced by overruns, and hot water must also frequently be wasted by dumping if overheated. The danger of overruns with a heater involving my invention is overcome to such an extent that insulated tanks may be readily employed with safety, thus effecting further economies.

From the standpoint of conservation of fuel, the heater involving this principle has decided advantages. The fire pot is effectively isolated and the heat of the fuel is conserved in the fuel bed, when not being used. Much lower combustion rates during banking are thus available without danger of extinguishing the fire. For example, if a convection or conduction heater burning solid fuel is employed and the fire is banked, a very large percentage of the maximum amount of heat will still be transferred to the water. With such a high emanation of heat from the fire pot, relatively large amounts of coal must be burned to maintain the temperature of the fire and to prevent its extinguishment. By employing a heater in accordance with my invention under the same conditions only a relatively small percentage of the original amount of heat transferred to the water will take place when the fire is banked. Consequently less fuel is consumed in maintaining the fire at its minimum temperature, and dangerous overheating is avoided.

The magazine fuel feed is particularly advantageous in connection with this invention in that sufficient fuel is always available to prevent the fire from dying out in the event that the fire is left unattended for several days.

The embodiment of my invention here disclosed may be modified by the inclusion of provisions for regulating the flow of air through the passage 13 to the chimney, such as described and claimed in the co-pending application of H. J. Rose, Serial No. 78,549, filed May 8, 1936, and also the provision of any suitable thermostatic damper control means.

Various other modifications may be made within the spirit of my invention as long as the principle thereof is employed. The proportions of fire pot may be varied in accordance with heating requirements and the size of the fuel to be burned. The medium to be heated may be confined in any suitable form of jacket and the cross-section of the jacket and fire pot may be of any suitable shape such as circular, oblong, oval, or rectangular in order to vary the ratio of volume of fuel to radiating surface. Other fluid mediums than water may be heated in this manner including gases and/or oil liquids and while the invention has been described in conjunction with a domestic hot water heater, it will be apparent that it may be also used for other purposes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for heating comprising a jacket for containing the fluid medium to be heated arranged to define a substantially vertical central opening, and a fire pot for burning solid fuel disposed wholly within said opening, said fire pot having a wall spaced from said jacket, said jacket being constructed and arranged so that heat received by said jacket from said fire pot is transferred thereto from said wall principally by radiation.

2. A heating furnace including a fire pot having a side wall and constructed to burn solid fuel, a jacket for containing a fluid medium to be heated surrounding said fire pot wall and spaced therefrom, the space between said fire pot and jacket being substantially enclosed, said jacket being constructed and arranged so that the principal portion of the heat from said fire pot is transferred to said jacket by radiation from said wall.

3. A furnace of the class described comprising a grate for supporting solid fuel, a jacket for containing a fluid medium to be heated having inner and outer walls and arranged around said grate, and a partition enclosed within and spaced from said inner jacket wall and defining a fire pot for solid fuel above said grate, said partition and jacket being so constructed and arranged that substantially all of the heat transferred to the fluid medium is radiated across the space between the partition and the inner jacket wall.

4. In a furnace, a fire pot including a side wall, a magazine disposed above said fire pot for supplying solid fuel thereto as needed, and means for confining a fluid to be heated surrounding said fire pot side wall in spaced relationship thereto, said fire pot wall and confining means being constructed and arranged so that heat received by said confining means from said fire pot is transmitted thereto principally by radiation from said wall.

5. In a heating furnace, a jacket for confining a fluid to be heated, a fuel confining shell within said jacket and laterally spaced therefrom, grate means for supporting a bed of solid fuel for combustion within said shell, and means for preventing the free passage of air between the lower portion of said shell and said jacket, said shell and jacket being so constructed, arranged and spaced from each other that the principal portion of the heat from said shell is transmitted to said jacket by radiation.

6. Heating apparatus comprising a jacket comprising inner and outer walls for containing a fluid medium, inlet and outlet means for said jacket, means defining a fire pot for burning solid fuel including a wall spaced from said jacket for transmitting the heat from said fire pot to said jacket principally by radiation from said wall, the inner wall of said jacket defining an opening therewithin, and means providing for withdrawal of combustion gases from said fire pot upwardly within the opening defined by the inner wall of said jacket and thence transversely of said jacket to a discharge stack.

7. Heating apparatus comprising a jacket comprising inner and outer walls for containing a fluid medium, inlet and outlet means for said jacket, means including a wall defining a fire pot for burning solid fuel, said fire pot wall being spaced from said jacket for transmitting the heat from said fire pot wall to said jacket principally by radiation, the inner wall of said jacket defining an opening therewithin, and means providing for withdrawal of combustion gases from said fire pot upwardly within the opening defined by the inner wall of said jacket, the space between said inner jacket wall and said fire pot defining means being closed to travel of combustion gases for the major portion of the height of said fire pot wall.

8. Heating apparatus comprising a fire-pot having a side wall for confining a stationary mass of lump fuel, means for confining a fluid to be heated and surrounding said fire-pot in laterally spaced relation thereto, said means being constructed and arranged so that the principal portion of the heat from said fuel is transferred from said wall to said means by radiation.

9. Apparatus for heating comprising a jacket for containing a fluid medium to be heated and arranged to define a substantially vertical central opening, and a fire-pot comprising a continuous imperforate wall for confining solid fuel and disposed within said opening, said fire-pot wall being spaced from said jacket to provide a space closed to the passage of combustion gases, said jacket being constructed and arranged so that heat received from said fire pot is transferred from said fire-pot wall to said jacket principally by radiation.

10. Apparatus for heating comprising a jacket for containing a fluid medium to be heated, means for introducing and removing fluid from said jacket, and means including walls spaced laterally from said jacket for defining a solid lump fuel burning fire pot, said jacket substantially enclosing the heat radiating surface of said walls and being constructed and arranged so that heat received by said jacket from said fire pot is transmitted thereto principally by radiation from said walls.

11. Apparatus for heating a fluid medium comprising confining means for holding said fluid, means for introducing and removing fluid from said confining means, and means including a side wall laterally spaced from said confining means for defining a solid lump fuel burning fire pot, the space between the heat radiating surface of said fire pot wall and said confining means being substantially enclosed by said confining means, and said fire pot wall and confining means being constructed and arranged so that heat received by said confining means from said fire pot is transmitted thereto principally by radiation from said wall.

RAYMOND C. JOHNSON.

CERTIFICATE OF CORRECTION.

Patent No. 2,151,516.      March 21, 1939.

RAYMOND C. JOHNSON.

It is hereby certified that error appears in the printed specification of the above numbered patent requiring correction as follows: Page 2, first column, line 9, for the word "four" read fourth; and second column, line 35, strike out "oil"; and that the said Letters Patent should be read with this correction therein that the same may conform to the record of the case in the Patent Office.

Signed and sealed this 27th day of June, A. D. 1939.

Henry Van Arsdale
Acting Commissioner of Patents.

(Seal)

and jacket being so constructed and arranged that substantially all of the heat transferred to the fluid medium is radiated across the space between the partition and the inner jacket wall.

4. In a furnace, a fire pot including a side wall, a magazine disposed above said fire pot for supplying solid fuel thereto as needed, and means for confining a fluid to be heated surrounding said fire pot side wall in spaced relationship thereto, said fire pot wall and confining means being constructed and arranged so that heat received by said confining means from said fire pot is transmitted thereto principally by radiation from said wall.

5. In a heating furnace, a jacket for confining a fluid to be heated, a fuel confining shell within said jacket and laterally spaced therefrom, grate means for supporting a bed of solid fuel for combustion within said shell, and means for preventing the free passage of air between the lower portion of said shell and said jacket, said shell and jacket being so constructed, arranged and spaced from each other that the principal portion of the heat from said shell is transmitted to said jacket by radiation.

6. Heating apparatus comprising a jacket comprising inner and outer walls for containing a fluid medium, inlet and outlet means for said jacket, means defining a fire pot for burning solid fuel including a wall spaced from said jacket for transmitting the heat from said fire pot to said jacket principally by radiation from said wall, the inner wall of said jacket defining an opening therewithin, and means providing for withdrawal of combustion gases from said fire pot upwardly within the opening defined by the inner wall of said jacket and thence transversely of said jacket to a discharge stack.

7. Heating apparatus comprising a jacket comprising inner and outer walls for containing a fluid medium, inlet and outlet means for said jacket, means including a wall defining a fire pot for burning solid fuel, said fire pot wall being spaced from said jacket for transmitting the heat from said fire pot wall to said jacket principally by radiation, the inner wall of said jacket defining an opening therewithin, and means providing for withdrawal of combustion gases from said fire pot upwardly within the opening defined by the inner wall of said jacket, the space between said inner jacket wall and said fire pot defining means being closed to travel of combustion gases for the major portion of the height of said fire pot wall.

8. Heating apparatus comprising a fire-pot having a side wall for confining a stationary mass of lump fuel, means for confining a fluid to be heated and surrounding said fire-pot in laterally spaced relation thereto, said means being constructed and arranged so that the principal portion of the heat from said fuel is transferred from said wall to said means by radiation.

9. Apparatus for heating comprising a jacket for containing a fluid medium to be heated and arranged to define a substantially vertical central opening, and a fire-pot comprising a continuous imperforate wall for confining solid fuel and disposed within said opening, said fire-pot wall being spaced from said jacket to provide a space closed to the passage of combustion gases, said jacket being constructed and arranged so that heat received from said fire pot is transferred from said fire-pot wall to said jacket principally by radiation.

10. Apparatus for heating comprising a jacket for containing a fluid medium to be heated, means for introducing and removing fluid from said jacket, and means including walls spaced laterally from said jacket for defining a solid lump fuel burning fire pot, said jacket substantially enclosing the heat radiating surface of said walls and being constructed and arranged so that heat received by said jacket from said fire pot is transmitted thereto principally by radiation from said walls.

11. Apparatus for heating a fluid medium comprising confining means for holding said fluid, means for introducing and removing fluid from said confining means, and means including a side wall laterally spaced from said confining means for defining a solid lump fuel burning fire pot, the space between the heat radiating surface of said fire pot wall and said confining means being substantially enclosed by said confining means, and said fire pot wall and confining means being constructed and arranged so that heat received by said confining means from said fire pot is transmitted thereto principally by radiation from said wall.

RAYMOND C. JOHNSON.

---

CERTIFICATE OF CORRECTION.

Patent No. 2,151,516.     March 21, 1939.

RAYMOND C. JOHNSON.

It is hereby certified that error appears in the printed specification of the above numbered patent requiring correction as follows: Page 2, first column, line 9, for the word "four" read fourth; and second column, line 35, strike out "oil"; and that the said Letters Patent should be read with this correction therein that the same may conform to the record of the case in the Patent Office.

Signed and sealed this 27th day of June, A. D. 1939.

Henry Van Arsdale
Acting Commissioner of Patents.

(Seal)